(12) United States Patent
Tanaka et al.

(10) Patent No.: US 6,563,778 B2
(45) Date of Patent: May 13, 2003

(54) DISC EJECTING APPARATUS

(75) Inventors: Shinsaku Tanaka, Tokyo (JP); Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 96 days.

(21) Appl. No.: 09/866,720

(22) Filed: May 30, 2001

(65) Prior Publication Data

US 2002/0015375 A1 Feb. 7, 2002

(30) Foreign Application Priority Data

Jun. 1, 2000 (JP) ........................................ 2000-163852

(51) Int. Cl.[7] .............................................. G11B 33/02
(52) U.S. Cl. ..................... 369/77.1; 369/219; 369/75.1; 369/75.2; 369/30.98; 369/30.99
(58) Field of Search ................ 369/75.1, 75.2, 369/77.1, 219, 30.98, 30.99

(56) References Cited

U.S. PATENT DOCUMENTS

| 4,701,901 A | * 10/1987 | Imai ........................... 369/75.2 |
| 5,473,593 A | * 12/1995 | Wheeler ..................... 369/77.1 |
| 5,633,850 A | * 5/1997 | Park ........................... 369/77.1 |
| 6,266,311 B1 | * 7/2001 | Song et al. ................. 369/77.1 |

FOREIGN PATENT DOCUMENTS

| JP | 2000-11511 | 1/2000 |
| JP | 2000-298903 | 10/2000 |

* cited by examiner

Primary Examiner—William Korzuoh
Assistant Examiner—Mark Blouin
(74) Attorney, Agent, or Firm—Jones, Tullar & Cooper, P.C.

(57) ABSTRACT

The present invention relates to a disc ejecting apparatus for quickly ejecting a disc by utilizing a pick-up drive motor. A slip mechanism is provided in a first route leading from the pick-up drive motor to a pick-up, and a switching mechanism is provided in a second route leading from the pick-up motor to a disc ejecting mechanism.

5 Claims, 18 Drawing Sheets

DISC EJECTING APPARATUS

BACKGROUND OF THE INVENTION

1. Field of the Invention

This invention relates to disc ejecting apparatuses for ejecting a disc by utilizing a pick-up drive motor.

2. Description of the Prior Art

Among prior art disc ejecting apparatuses is one, in which a first power transmission route leading from a pick-up drive motor to a pick-up and a second power transmission route leading from the pick-up drive motor to a disc ejecting mechanism are alternately turned on and off.

With this construction, in response to an eject commanding operation the first power transmission route is turned on, namely the route becomes valid, to restore the pick-up to the initial position, and then as the first power transmission route is tuned off, namely the route is cut off, at the same time the second power transmission route must be turned on to eject the disc. In other words, the disc ejection can not be commenced as soon as the eject commanding operation is done, so that the disc can not be quickly ejected.

The invention was made to solve the above problem, and it has an object of providing a disc ejecting apparatus for ejecting a disc by utilizing a pick-up drive motor, in which the disc ejection can start quickly while restoring the pick-up to the initial position.

SUMMARY OF THE INVENTION

In the disc ejecting apparatus according to the invention, a slip mechanism is provided in a first power transmission route leading from a pick-up drive motor to a pickup such that, when a load exceeds a predetermined value, the slip mechanism causes a slip action and cuts off the power transmission from the pick-up drive motor to the pick-up. Also, in a second power transmission route leading from the pick-up drive motor to a disc ejecting mechanism, a switching mechanism operable for selectively turning on and off the second power transmission route is provided such that in response to an eject commanding operation the switching mechanism is turned on, namely positioned into an "on" state in which the route is turned on, to cause ejection of the disc by the disc ejecting mechanism while causing restoration of the pick-up to the initial position by the pick-up drive motor. After the pick-up has been restored to the initial position, the disc ejection by the disc ejecting mechanism is continued with the slip action of the slip mechanism.

Effectively, an excess load absorbing mechanism for cutting off the power transmission when experiencing a power load in excess of the load in the slip mechanism, is provided in the second power transmission route. With this arrangement, when it is intended to irrationally stop the disc ejection, the excess load absorbing mechanism absorbs the excess torque of the pick-up drive motor and thus prevents damage to the system.

Also, effectively a hold mechanism for holding the switching mechanism in the "on" state is provided such as to release the switching mechanism from the "on" state to an "off" state in the last stage of the disc ejection of the disc ejecting mechanism. In the "off" state, the switching mechanism operates to turn off, namely cut off, the second power transmission route. With this arrangement, the second power transmission route can be automatically turned off, namely cut off, after completion of the disc ejection.

Furthermore, effectively a high voltage supply means for supplying a high voltage to the pick-up drive motor in response to an eject commanding operation, is provided. With this arrangement, in the disc ejection the motor is driven at a higher speed to permit more quicker disc ejection.

In a specific construction of the disc ejecting apparatus according to the invention, a slip mechanism is provided in a first power transmission route leading from a pickup drive motor to a pick-up, and a switching mechanism is provided in a second power transmission route leading from the pick-up drive motor to a disc ejecting mechanism. By doing the eject commanding operation at this time, the pick-up drive motor is started to cause movement of the pick-up toward the initial position. At this time, the switching mechanism is also turned on, namely positioned in the "on" state to cause operation of the disc ejecting mechanism to effect the disc ejection. When the load in the first power transmission route exceeds a predetermined value or level as a result of the restoration of the pick-up to the initial position, the slip mechanism commences a slip action to cut off the power transmission, while the disc ejecting mechanism continues the disc ejection with the torque of the pick-up drive motor.

An excess load absorbing mechanism for cutting off the power transmission when experiencing a load in excess of the load in the slip mechanism, is provided in the second power transmission route. With this arrangement, when the disc ejection is irrationally stopped, the excess load absorbing mechanism absorbs the torque of the pick-up drive motor to prevent damage to the system.

Furthermore, a hold mechanism is provided to hold an eject knob in a depressed position so as to hold the switching mechanism in the "on" state and also allow the disc ejecting mechanism to release the eject knob for restoration in the last stage of the disc ejection. With this arrangement, upon completion of the disc ejection the switching mechanism is turned off, namely positioned into an "off" state to cut off the second power transmission route.

Still further, a high voltage supply means is provided to supply a high voltage to the pick-up drive motor in response to an eject commanding operation. With this arrangement, the motor is driven at a higher speed to permit still quicker pick-up restoration and disk ejection.

BRIEF DESCRIPTION OF THE DRAWINGS

These and other objects, features and advantages of the invention will become more apparent upon reading of the following detailed specification and drawings, in which.

DETAILED DESCRIPTION OF THE PREFERRED EMBODIMENTS

Figure 1:
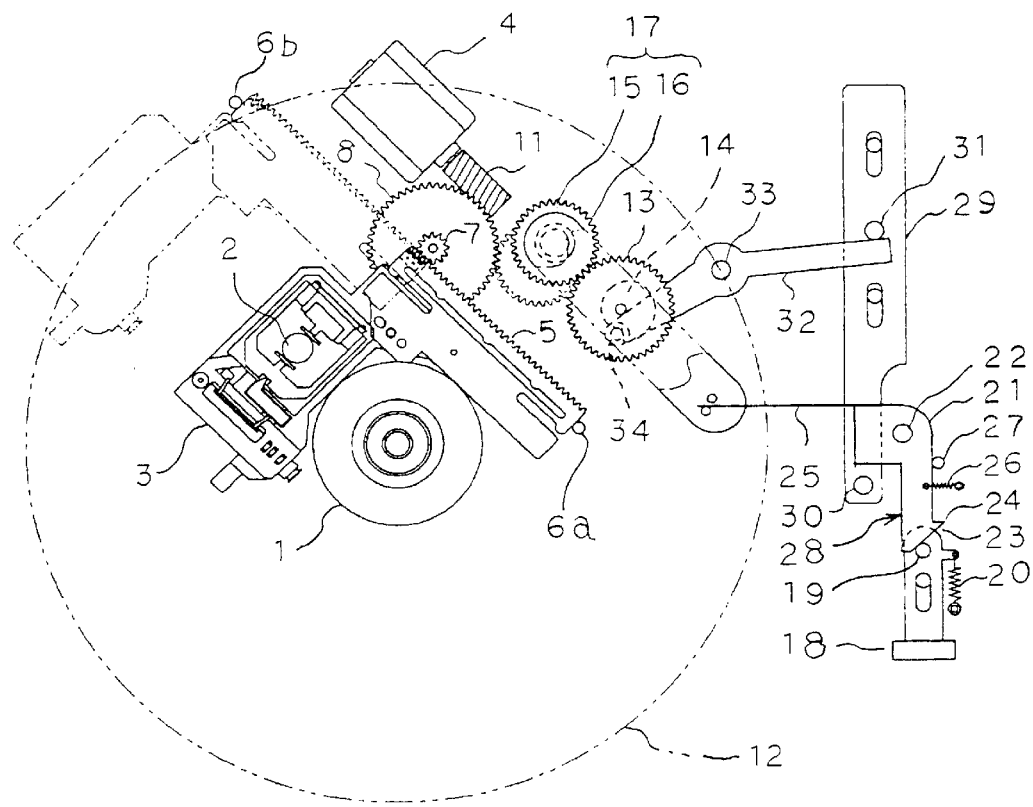
FIG. 1 is a schematic plan view showing a first embodiment of the disc ejecting apparatus according to the invention.

FIGS. 1 to 5 show a first embodiment of the disc ejecting apparatus according to the invention. FIG. 1 is a schematic plan view showing a disc player with the disc ejecting apparatus in a state that a disc is loaded in a predetermined playback position. In the figures, reference numeral 1 designates a turntable, numeral 2 designates a pick-up, numeral 3 designates a pick-up support reciprocally with the pick-up 2 supported thereon, and numeral 4 designates a pick-up drive motor.

Figure 2:
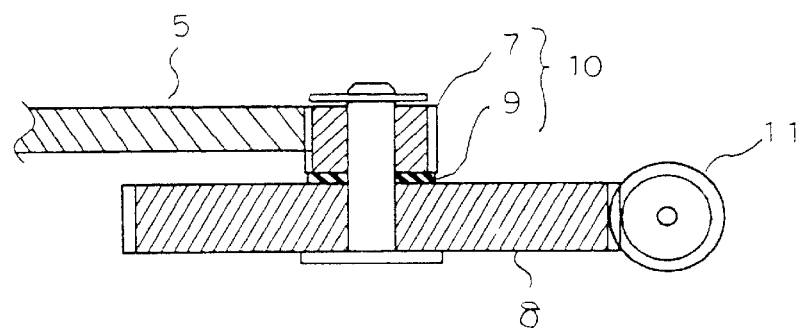
FIG. 2 is a schematic sectional view showing part of the same embodiment.

The turntable 1 is driven by a turntable drive motor (not shown) for rotation. The pick-up support 3 has a rack 5, which is reciprocally moved along a straight orbit between stoppers 6a and 6b. The pick-up support 5 also has a pinion 7 and a worm gear 8 coaxially mounted and disposed in the neighborhood of the rack 5. The pinion 7 is in mesh with the rack 5. As shown in FIG. 2, a friction sheet 9 is interposed between the pinion 7 and the worm gear 8. The pinion 7 and the friction sheet 9 together constitute a slip mechanism 10. The slip mechanism 10 is provided in a first power transmission route leading from the pick-up drive motor 4 to the pick-up 2.

The worm gear 8 is in mesh with a worm 11 secured to the shaft of the pick-up drive motor 4. The torque of the pickup drive motor 4 is transmitted via the worm 11, the worm gear 8, the slip mechanism 10 and the rack 5 to the pick-up support 3. When the pick-up drive motor 4 is rotated for rotation in one direction, the pick-up 2 is moved in unison with the pick-up support 3 along the recording surface of the disc 12 from the inner side thereof toward the outer side. When the motor 4 is driven for rotation in the other direction, the pick-up 2 is moved toward the inner side, i.e., the initial position. The moving range of the pick-up support 3 when playing back the disc 12 is set to be less than a maximum moving range, and the pick-up support 3 thus is not moved up to the end position. However, after the stopping of the pick-up support 3 at the initial position as restricted by the stopper 6a, the pick-up drive motor 4 is continually driven for rotation owing to a slip action brought about between the pinion 7 and the friction sheet 9.

Reference numeral 13 in the figures designates a cam gear. The cam gear 13 has a spiral cam 14 formed on the back side. A rocking member 15 has its central portion supported on the shaft of the cam gear 13. The rocking member 15 has switching gear 16 supported on one end portion of it and in mesh with the cam gear 13. The switching gear 16 and the rocking member 15 together constitute a switching mechanism 17. With the rocking movement of the rocking member 15, the switching gear 16 is brought into mesh with or separated from the worm gear 8 to turn on or off a second power transmission route leading to the disc ejecting mechanism.

Reference numeral 18 in the figures designates an eject knob. The eject knob 18 has a push-forth protuberance 19 and is biased by a spring 20 in the restoring direction. A hook lever 21 is rockably supported on an axis 22, and has an inclined surface 23 and an engagement shoulder 24. The inclined surface 23 and the engagement shoulder 24 are continually formed in an end portion of the hook lever 21. The inclined surface 23 faces the push-forth protuberance 19 of the eject knob 18. A leaf spring 25 has one end portion attached to the other end of the hook lever 21 and the other end portion of the leaf spring 25 engaged with the other end portion of the rocking member 15. The hook lever 21 is biased by a spring 26 in one direction, and its rocking movement in the biasing direction is restricted by a stopper 27. The hook lever 21, the spring 26 and the stopper 27 together constitute a hold mechanism 28.

Reference numeral 29 in the figures designates a slide member as part of a disc ejecting mechanism. With upward movement of the slide member 29 in the figures, a disc ejecting mechanism ejects the disc 12 out of the playback position. The disc ejecting mechanism itself is well known in the art, and is not described. The slide member 29 has a push-forth protuberance 30 facing a portion of the hook lever 21 and an engagement portion 31.

Reference numeral 32 in the figures designates a coupling lever rockably mounted on an axis 33. The coupling lever 32 has a cam follower pin 34 provided on one end, and has the other end facing the slide member 29.

When the switching gear 16 (i.e., switching mechanism 17) is brought into mesh with the worm gear 8 with counterclockwise rocking of the rocking member 15, the torque of the pick-up drive motor 4 is transmitted through the worm gear 8 and the switching gear 16 to the cam gear 13 to cause rotation thereof, thus causing the spiral cam 14 to push the cam follower pin 34 of the coupling lever 32 and cause counterclockwise rocking thereof. As a result, the coupling lever 32 pushes the engagement portion 31 of the slide member 29 to cause upward movement thereof in the figures, whereby the disc ejecting mechanism executes the disc ejection.

In the disc ejecting apparatus having the above construction, by depressing the eject knob 18 during playback operation with the disc 12 loaded on the turntable 1, a switch (not shown) is turned on to cause movement of the pick-up toward the initial position, and also the push-forth protuberance 19 of the eject knob 18 pushes the inclined surface 23 of the hook lever 21 to cause clockwise rocking thereof. The hook lever 21 thus causes counterclockwise rocking movement of the rocking member 21 to bring the switching gear 16 into mesh with the worm gear 8. At this time, excess rocking movement of the hook lever 21 is absorbed by the bending of the leaf spring 25.

Figure 3:
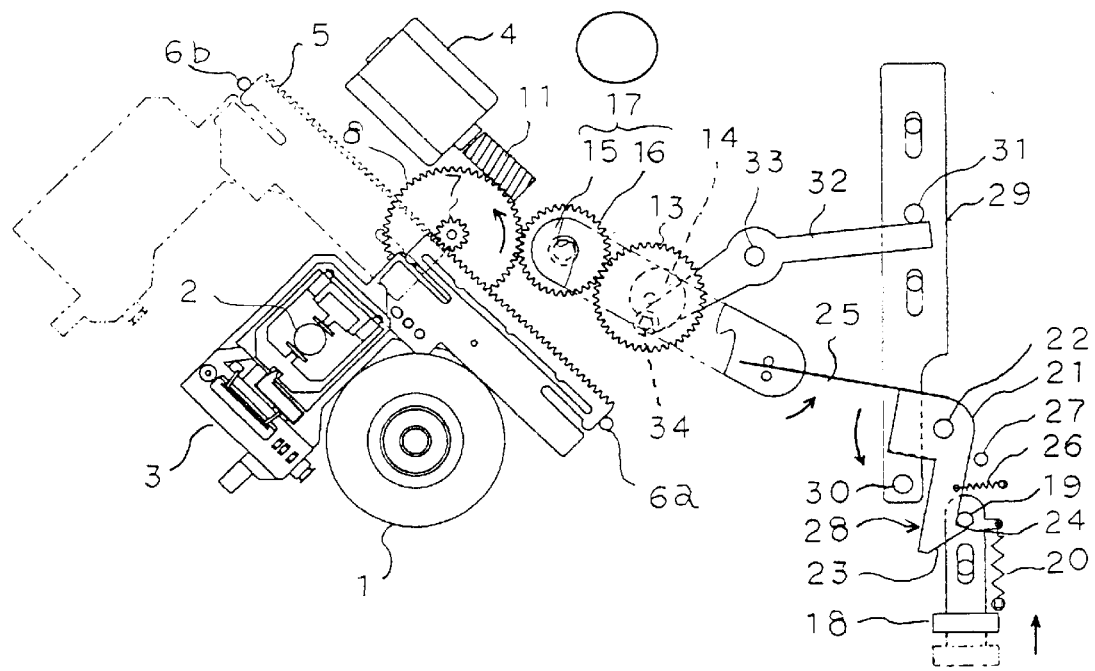
FIG. 3 is a schematic plan view showing the same embodiment in an operating state.
Figure 4:
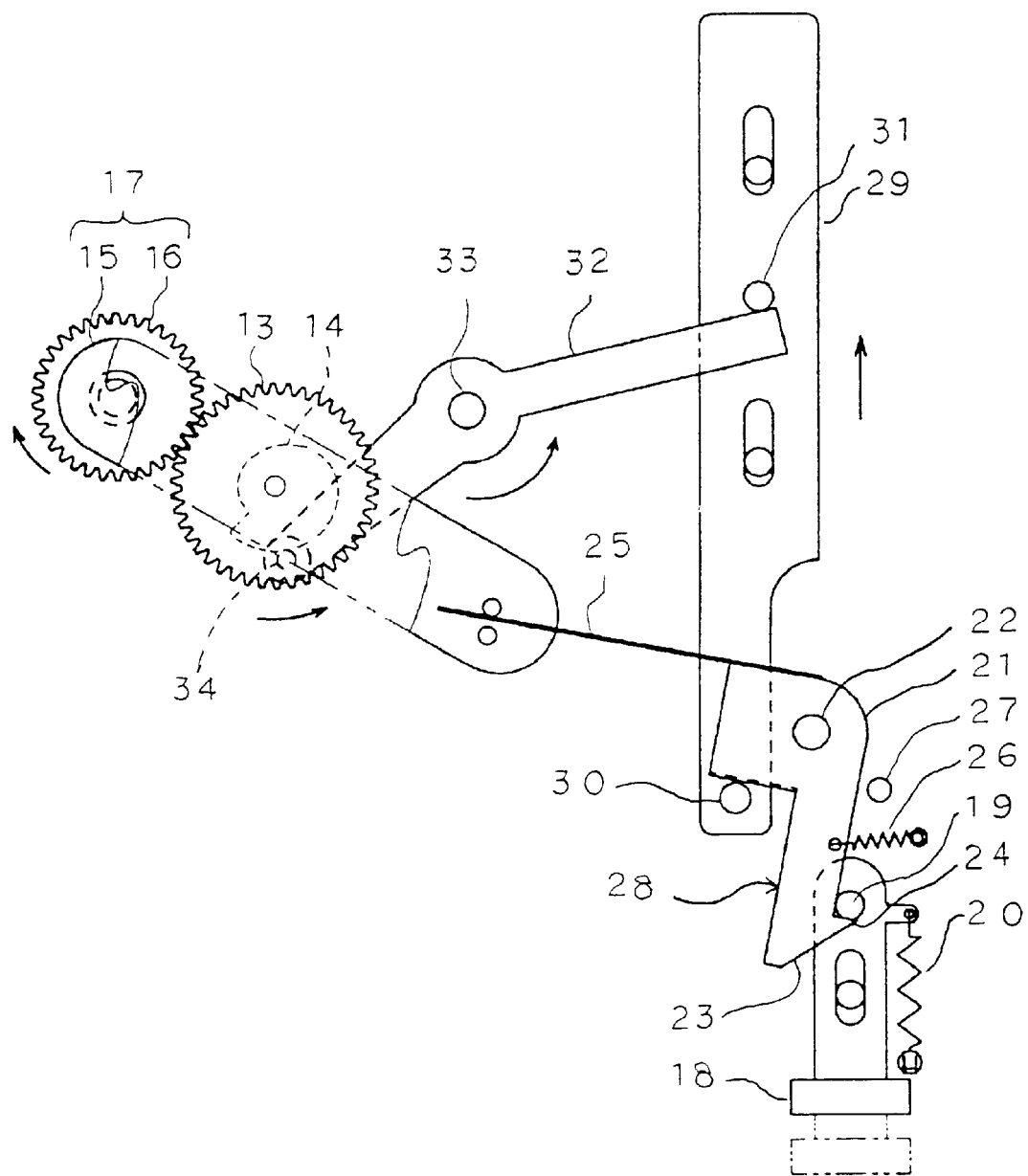
FIG. 4 is a schematic plan view showing the same embodiment in an operating state.

When the push-forth protuberance 19 of the eject knob 18 eventually gets out of the inclined surface 23, the hook lever 21 is slightly restored by the elasticity of the spring 26 and the leaf spring 25. As a result, the eject knob 18 is held in the depressed position by the engagement shoulder 24. Thus, as shown in FIG. 3, the switching gear 15 is held in its position in which it is in mesh with the worm gear 8.

In this state, the torque of the pick-up drive motor 4 is transmitted via the worm gear 8 and the slip mechanism 10 to the pick-up support 3 to cause movement of the pick-up 2 from the outer side of the recording surface of the disc 12 toward the inner side. At the same time, the torque of the pick-up drive motor 4 is transmitted via the worm gear 8 and switching mechanism 17 to the cam gear 13 to cause counterclockwise rotation thereof. As a result, the spiral cam 32 pushes the cam follower pin 34 of the coupling lever 4 to cause counterclockwise rocking thereof. The coupling member 32 thus pushes with its other end the engagement portion 31 of the side member 29 and causes upward movement thereof in the figures. This upward movement of the slide member 29 causes the disc ejecting mechanism to execute the operation of ejecting the disc 12 out of the playback position.

Figure 5:
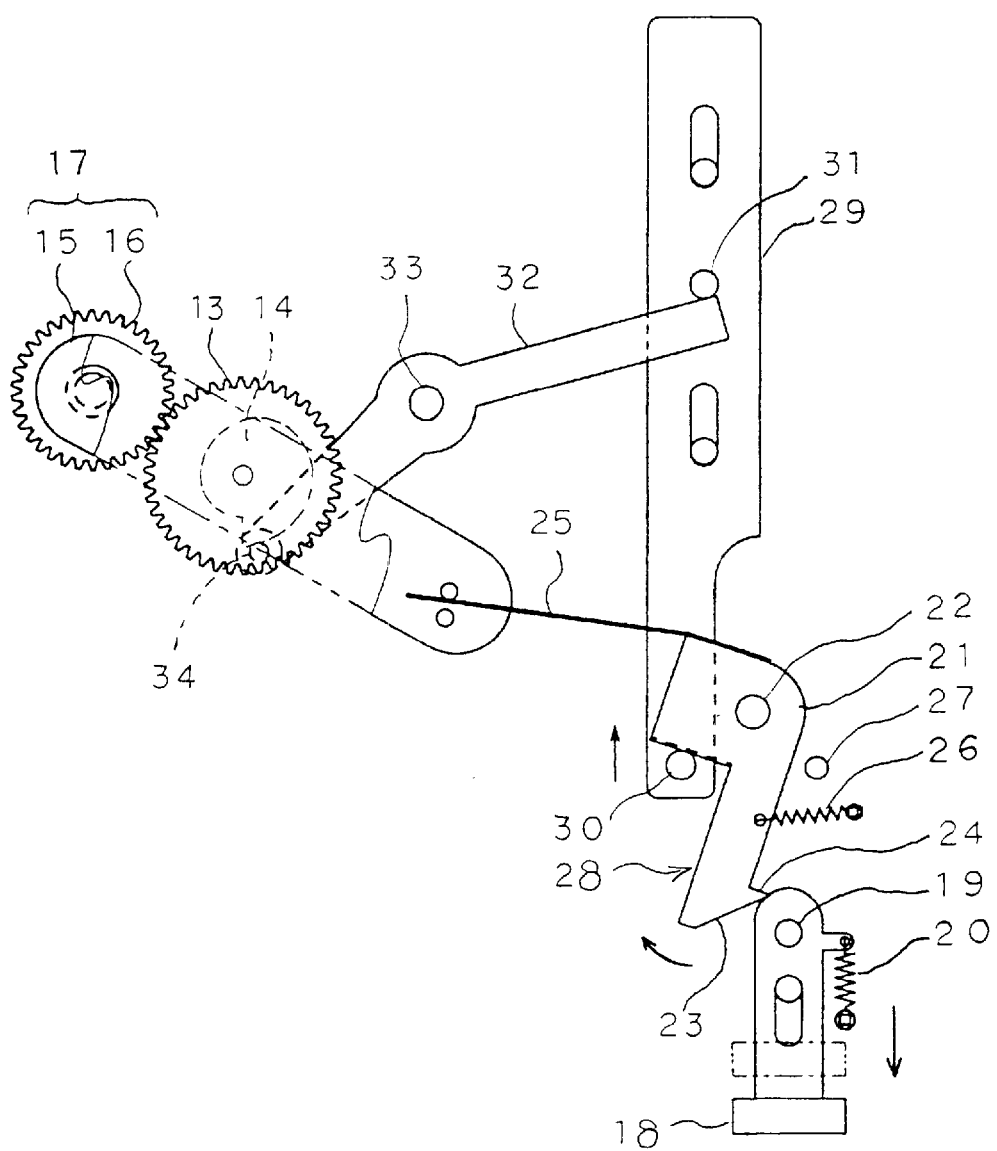
FIG. 5 is a schematic plan view showing the same embodiment in an operating state.

While the pick-up support 3 strikes against and is stopped by the stopper 6a to position the pick-up 2 in the initial position, the pick-up drive motor 4 is continually driven for rotation owing to the slip action between the pinion 7 and the friction member 9 constituting the slip mechanism 10. The cam gear 13 is also continually rotated by the torque of the motor 4 to continually move the slide member 29. In the last stage of the disc ejection by the disc ejecting mechanism, the push-forth protuberance 30 comes to push the hook lever 21, as shown in FIG. 5. As a result, the hook lever 21 is slightly rocked clockwise to cause the push-forth protuberance 19 of the eject knob 18 to be disengaged from the engagement shoulder 24. The eject knob 18 is thus restored by the spring 20. With the restoration of the eject knob 18, the pick-up drive motor 4 is stopped, and hook lever 21 and the rocking member 15 are restored to their initial positions, and the switching gear 16 is separated from the worm gear 8.

As has been shown, in the embodiment of the disc ejecting apparatus, the slip mechanism 10 is provided in the first power transmission route leading from the pick-up drive motor 4 to the pick-up 2, and the switching mechanism 17 is provided in the second power transmission route leading from the pick-up drive motor 4 to the disc ejecting mechanism such that the switching mechanism 17 operates to selectively turn on and off the second power transmission route. Thus, by turning on the switching mechanism 17 and positioning it into the "on" state by the eject commanding operation, the disc ejecting mechanism is caused to eject the disc 12 while causing the movement of the pick-up 2 to the initial position with the torque of the pick-up drive motor 4. In addition, after the restoration of the pick-up 2 to the initial position, the ejection of the disc 12 by the disc ejecting mechanism can be continued owing to the slip action of the slip mechanism 10. Thus, it is possible to advance the timing of commencement of the ejection of the disc 12 for quick ejection thereof.

Furthermore, the eject knob 18 is held in the depressed position by the hold mechanism 28, and in the last stage of the operation of ejecting the disc 12 by the disc ejecting mechanism it is released from the depressed state to separate the switching gear 16 from the work beam 8. Thus, the second power transmission route leading from the pick-up drive motor 4 to the disc ejecting mechanism can be automatically cut off simultaneously with the completion of the disc ejection.

Figure 6:
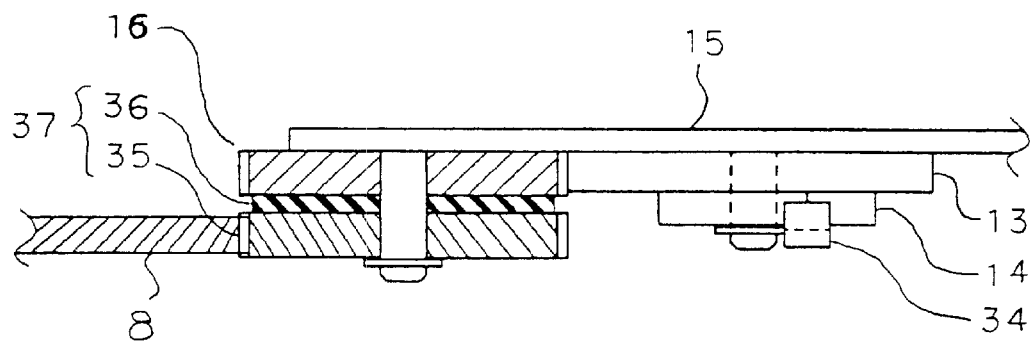
FIG. 6 is a schematic sectional view showing a modification of the same embodiment obtained by adding an excess load absorbing mechanism thereto.

FIG. 6 shows a modification of the first embodiment obtained by adding an excess load absorbing mechanism thereto. In the figures, parts like those in the first embodiment are designated by like reference numerals.

In this modification, the rocking member 15 supports, on one end portion thereof, an overlap gear 35 in addition to the switching gear 16 and having the same diameter as the switching gear 16, and a friction sheet 36 is interposed between the two gears 16 and 35. The gear 35 and the friction sheet 36 together constitute an excess load absorbing mechanism 37. The gear 35 is brought into mesh or separated from the worm gear 8 with the rocking movement of the rocking member 15.

When the gear 35 and the worm gear 6 are in mesh with each other, the torque of the pick-up drive motor 4 is transmitted via the worm gear 8, the gear 35 and the switching gear 16 to the cam gear 13 and thence via the coupling lever 32 of the disc ejecting mechanism including the slide member 29. When such an irrational external pressure as to interfere with the ejection of the disc 12 is exerted during the disc ejection, a slip action between the gear 35 and the friction sheet 36 is brought about to cut off the transmission of the power from the worm gear 8 to the cam gear 13.

The excess load absorbing mechanism is constructed such as to cut off the power transmission when it experiences a load in excess of the load in the slip mechanism 10.

With this arrangement, in the event of application of an irrational external pressure such as to interfere with the ejection of the disc 12, it is possible to prevent damage to various parts constituting the power transmission route owing to the slip action brought about between the gear 35 and the friction sheet 36.

Figure 7:
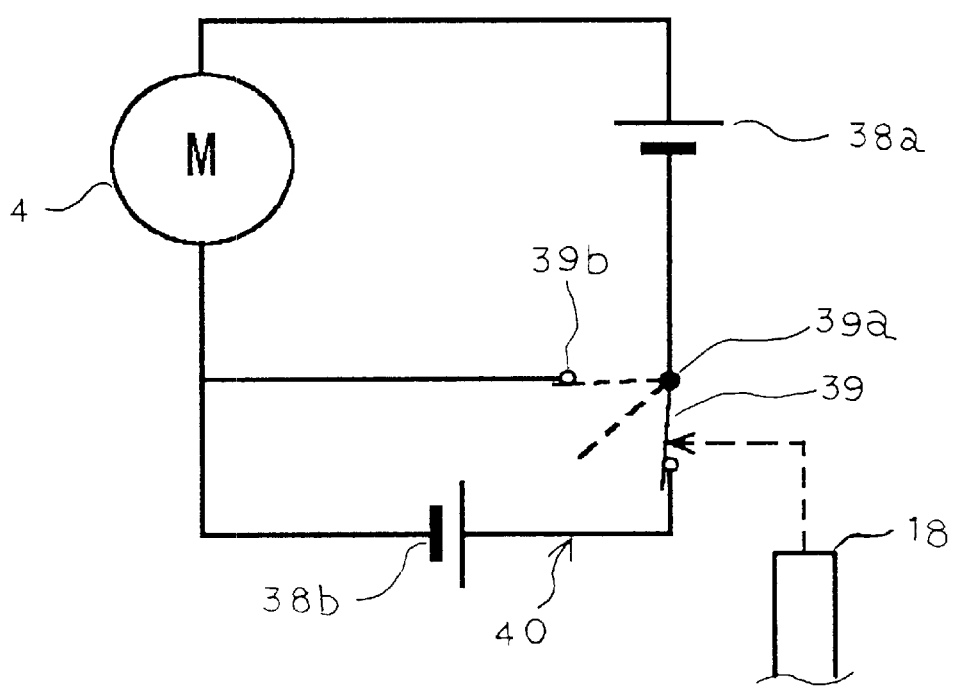
FIG. 7 is a circuit diagram showing a modification of the same embodiment obtained by adding a high voltage supply means thereto.

FIG. 7 shows a modification of the first embodiment obtained by adding to the same an arrangement for increasing the voltage supplied to the pick-up drive motor 4 when and only when an eject commanding operation is done. In FIG. 7, parts like those in the first embodiment are designated by like reference numerals or symbols.

Designated at 38a and 38b in FIG. 7 are a first and a second power supply source. Reference numeral 39 designates a control switch for controlling the pick-up drive motor 4. The control switch 39 has a first to a third contact 39a to 39c. The first and second power supply sources 38a and 38b and the control switch 39 together constitute a high voltage supply means 40.

The first power supply source 38a is connected across the pick-up drive motor 4 via the first and second contacts 39a and 39b in series with one another. The second power supply source 38b is inserted between the third and second contacts 39c and 39b.

When playing back the disc, the first and second contacts 39a and 39b of the control switch 39 are connected to each other. The first and third contacts 39a and 39c of the control switch 39 are connected to each other in response to the operation of depressing the eject knob 18 for the disc ejection. A polarity inverting means for switching the direction of rotation of the motor 4 at the time of the disc playback is not described.

With this arrangement, when playing back the disc the sole first power supply source 38a is connected, and when ejecting the disc the first and second power supply sources 38a and 38b are connected in series across the motor 4. Thus, at the time of the disc ejection the motor 4 is driven at an increased speed to effect a quick disc ejection.

FIGS. 8 to 12 show a second embodiment of the disc ejecting apparatus according to the invention. In the figures, parts like those in the first embodiment are designated by like reference numerals.

Figure 8:
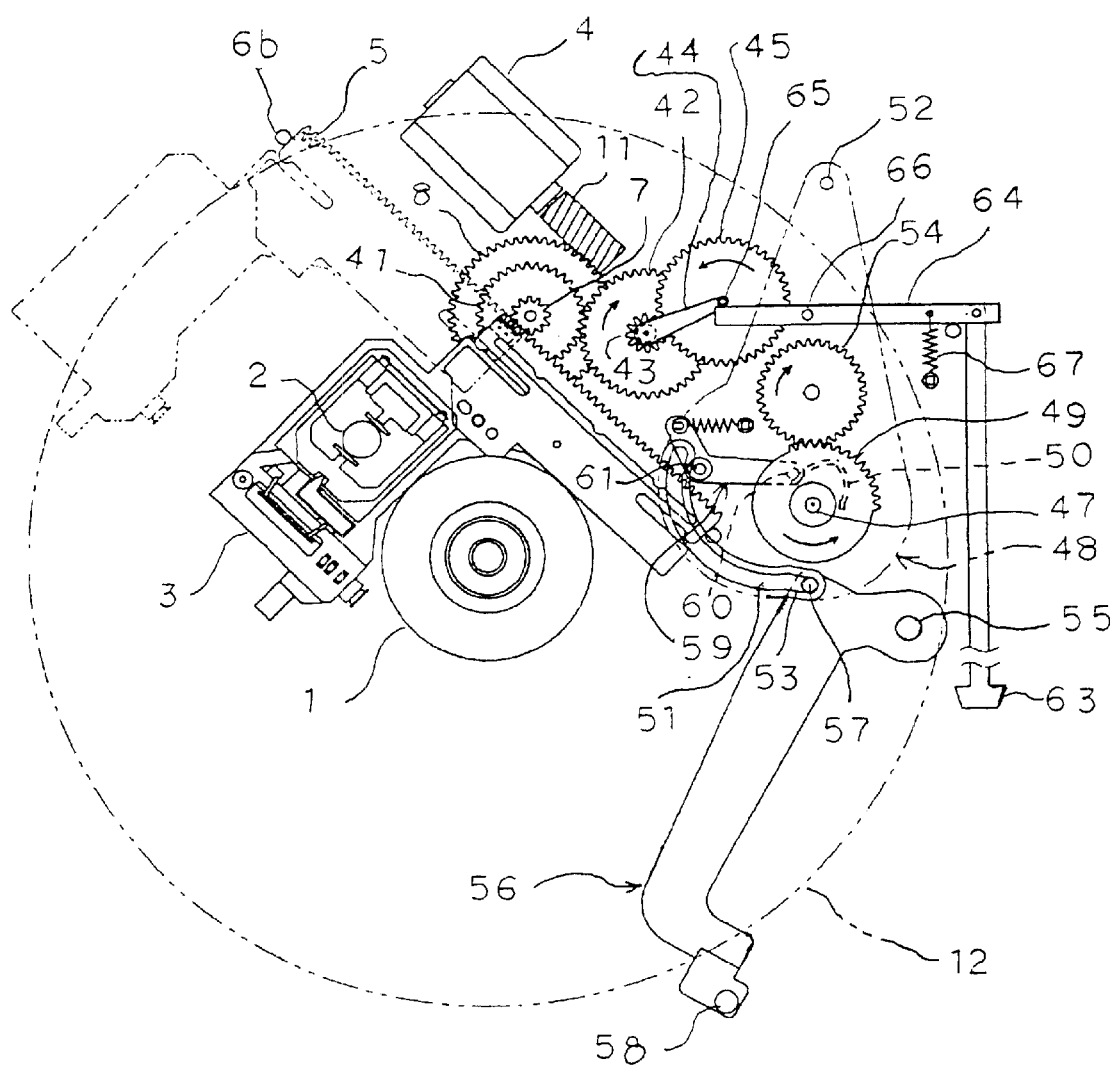
FIG. 8 is a schematic plan view showing a second embodiment to the disc ejecting apparatus according to the invention.

FIG. 8 is a schematic plan view showing the disc player with the disc ejecting apparatus in a state that the disc 12 is loaded in a predetermined playback position.

This embodiment is the same as the first embodiment in the construction that the pick-up support 3 supporting the pick-up 2 is disposed near the turntable 1 for reciprocation by the pick-up drive motor 4. The second embodiment is also the same as the first embodiment in that the torque of the pick-up drive motor is transmitted via the worm 11, the worm gear 8 and the pinion 7 in the mentioned order and thence to the pick-up support 3 via the rack 5 for moving the support 3 along a straight line in a range between the stoppers 6a and 6b.

Figure 9:
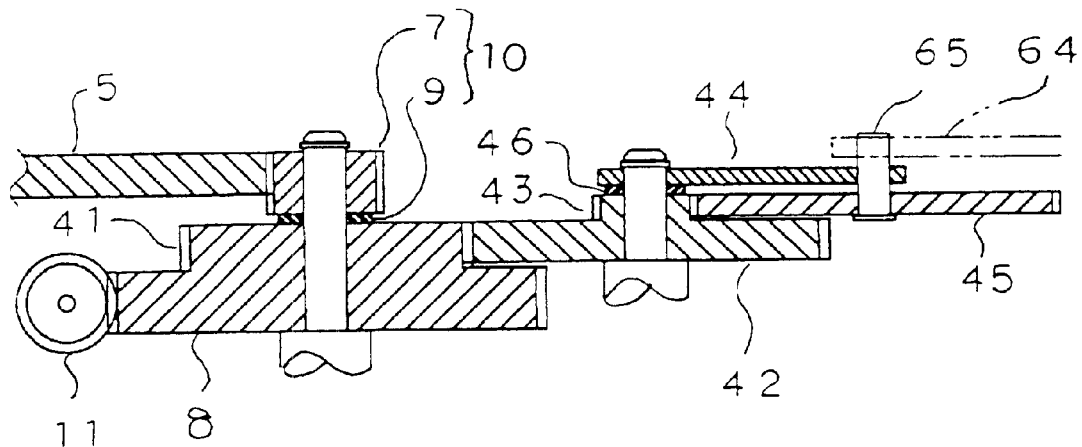
FIG. 9 is a schematic sectional view showing part of the same embodiment.

The worm gear 8 has an intermediate gear 41 formed as upper integral gear. As shown in FIG. 9, a friction sheet 9 is interposed between the intermediate gear 41 and the pinion 7. The pinion 7 and the friction sheet 9 together constitute the slip mechanism 10. The slip mechanism 10 is provided in a first power transmission route leading from the pick-up drive motor 4 to the pick-up 2.

Coaxial and integral large and small gears 42 and 43 are disposed near the worm gear 8. The large gear 42 is in mesh with the intermediate gear 41. The rocking member 44 is rockably supported on the axis supporting the large and small gears 42 and 43, and supports a switching gear 45 constituting a switching mechanism, the switching gear 45 being in mesh with the small gear 43. A friction sheet 46 is interposed between the small gear 43 and the rocking member 44. The rocking member 44 is adapted to be biased in the direction of rotation of the large and small gears 42 and 43.

A disk push-back member 48 is rockably supported as disc ejecting mechanism on an axis 47. The push-back member 48 has a sector gear 49 formed together with a hill-like raised portion 50 thereon in its rocking central portion, a cam groove 51 formed in the neighborhood of the sector gear 49 and a contact portion 52 in its end portion such as to be able to be in contact with the outer periphery of the disc 12. The cam groove 51 has such a shape that it gradually approaches the rocking center of the push-back member 48 from one end toward the other end. A portion 53 of the cam groove 51 adjacent to the other end thereof is inclined away from the center of rotation of the push-back member 48.

A gear 54 is in mesh with the sector gear 49 such that the switching gear 45 is brought into contact with and separated with the rocking movement of the rocking member 44.

A disc push-in member 56 rockably supported on an axis 55, has a cam follower pin 57 which is engaged in the cam groove 51. In this way, the push-back member 56 and the push-in member 56 are interlocked to each other. The push-in member 56 has a contact portion 58 formed in its end portion such as to be in contact with the outer periphery of the disc 12.

Reference numeral 59 designates a hold lever rockably supported on an axis 61 and having a forced contact portion 60 formed at an end. The hold lever 59 is biased by a spring 62 such that the portion 60 is held in forced contact with the hill-like raised portion 50. The position of the forced contact of the portion 60 with the raised portion 50 is changed by the rocking movement of the push-back member 48. Specifically, when the portion 60 is in forced contact with the inclined surface on the left side of the apex of the raised portion 50 as shown in FIG. 8, it biases the push-back member 48 in the clockwise direction. On the other hand, when the portion 60 is in forced contact with the inclined surface in the right side of the apex of the raised portion 50, it biases the push-back portion 48 in the counterclockwise direction 48.

Reference numeral 63 designates an eject knob. A pull-away lever 64 is coupled at one end to one end of the eject knob 63, and its other end faces an axis 65 supporting the switching gear 45. The pull-away lever 64 is rockably supported on an axis 66 and biased by a spring 67 in a direction to cause restoration of the eject knob 63 and pull the switching gear 45 away from the gear 54.

Figure 10:
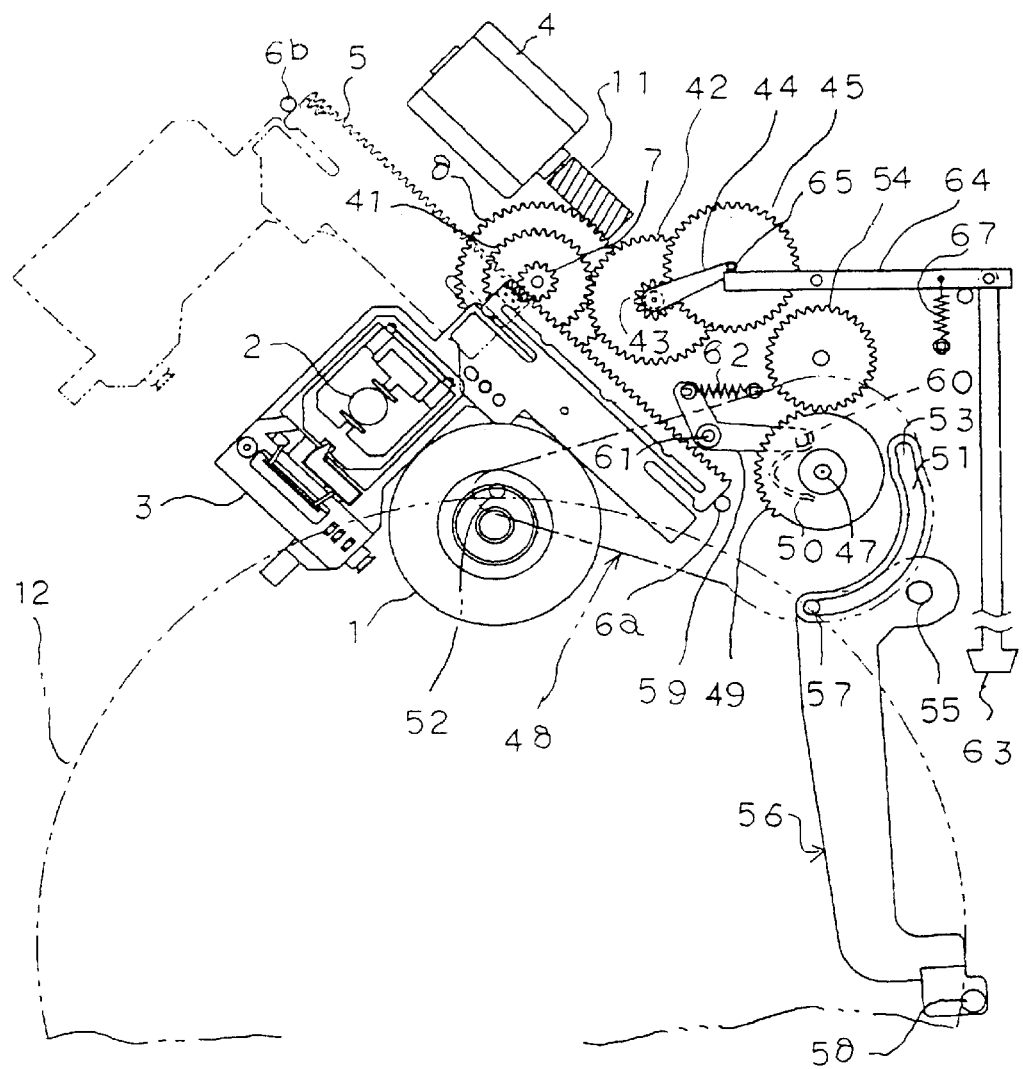
FIG. 10 is a schematic plan view showing the same embodiment in an operating state.

In the above construction, by inserting the disc 12 such that the outer periphery thereof is pushing the contact portion 52 of the push-back member 48 as shown in FIG. 10, the push-back member 48 is rotated in the clockwise direction, and the push-in member 56 is also rocked in the clockwise direction by following the push-back member 48. By further inserting the disc 12, the push-back member 48 receives the elastic force of the spring 62 with the left side inclined surface of the hill-like raised portion 50, and is rocked at a stretch in the clockwise direction. The outer periphery of the disc 12 is pushed by the contact portion 58 of the push-in member 56 to be brought into the device. When the cam follower pin 57 is brought to the inclined portion 5 of the cam groove 53, the push-in member 56 is slightly rocked in the counterclockwise direction to pull away the contact portion 58 from the disc 12 as shown in FIG. 8.

Figure 12:
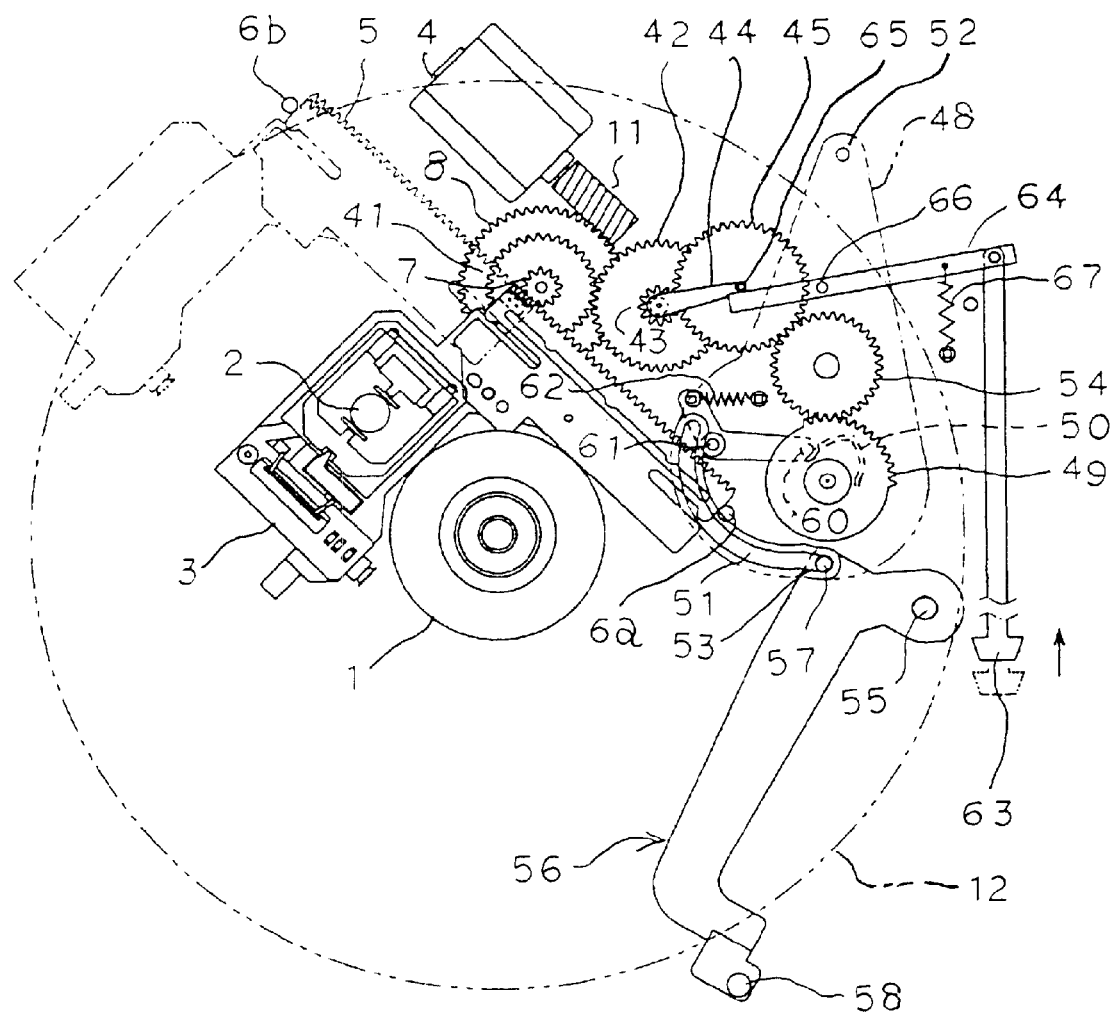
FIG. 12 is a schematic plan view showing the same embodiment in an operating state.

In this state, the playback operation is carried out. During this operation, by depressing the eject knob 63 as shown in FIG. 12, the torque of the pick-up drive motor 4 is transmitted via the slip mechanism 10 to the pinion 7 to cause movement of the pick-up 2 toward the initial position. Also, the rotation of the large and small gears 42 and 43 cause rocking of the rocking member 44 in the clockwise direction to bring the switching gear 45 and the gear 54 into mesh with each other.

Figure 11:
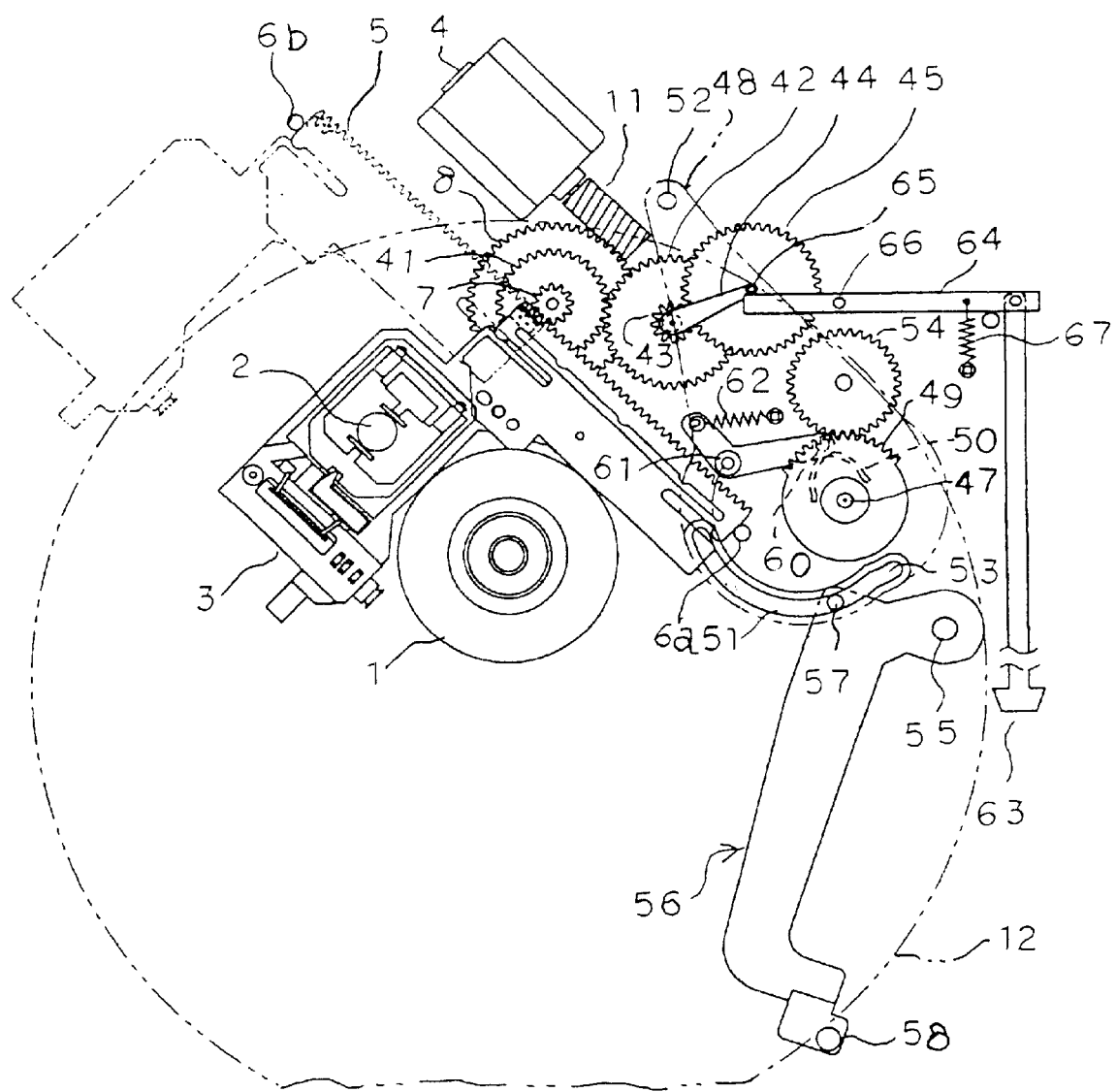
FIG. 11 is a schematic plan view showing the same embodiment in an operating state.

As a result, the torque of the motor 4 is transmitted via the gear 45 to the push-back member 48 to cause rocking thereof in the counterclockwise direction, thus causing the disc 12 to be pushed back by the contact portion 52 as shown in FIG. 11. When the contact portion 52 comes to push the right side inclined surface of the hill-like raised portion 50, the push-back member 48 is rotated at a stretch in the counterclockwise direction, thus causing the contact portion 52 to push back the disc 12 as shown in FIG. 10.

When the motor 4 is stopped in response to the detection that the disc 12 has been pushed back, the pull-away lever 64 is restored by a spring 67 while pulling away the switching gear 45 from the gear 54.

After the initial position has been reached by the pick-up 2, the operation of push-back member 48 to eject the disc 12 is continued owing the slip action of the slip mechanism 10.

Again in the construction of the second embodiment, like the first embodiment, the slip mechanism 10 is provided in the first power transmission route leading from the pick-up drive motor 4 to the pick-up 2, and the switching mechanism (i.e., switching gear 45) is provided in the second power transmission route leading form the pick-up drive motor 4 to the disc ejecting mechanism (i.e., push-back member) operable for selectively turning on and off the second power transmission route. Thus, with the turning-on operation of the switching mechanism by an eject commanding operation, the disk 12 can be ejected by the disc ejecting mechanism while the pick-up 2 is moved back to the initial position with the torque of the pick-up drive motor 4. Also, after the pick-up 2 has been restored to the initial position, the disc ejection of the disc 12 by the disc ejecting mechanism can be continued owing to the slip action of the slip mechanism 10. Thus, it is possible to advance the timing of commencement of the disc ejection and quickly eject the disc 12.

Also, the eject knob 18 can be held in its depressed position by the hold mechanism 28 and released from this position in the last stage of the disc ejection by the disc ejecting mechanism. Thus, the power transmission route leading from the pick-up drive motor 4 to the disc ejecting mechanism can be automatically cut off simultaneously with the completion of the disc ejection.

FIGS. 13 to 21 shows a third embodiment of the disc ejecting apparatus according to the invention. In the figures, parts like those in the above embodiment are designated by like reference numerals and symbols.

Figure 13:
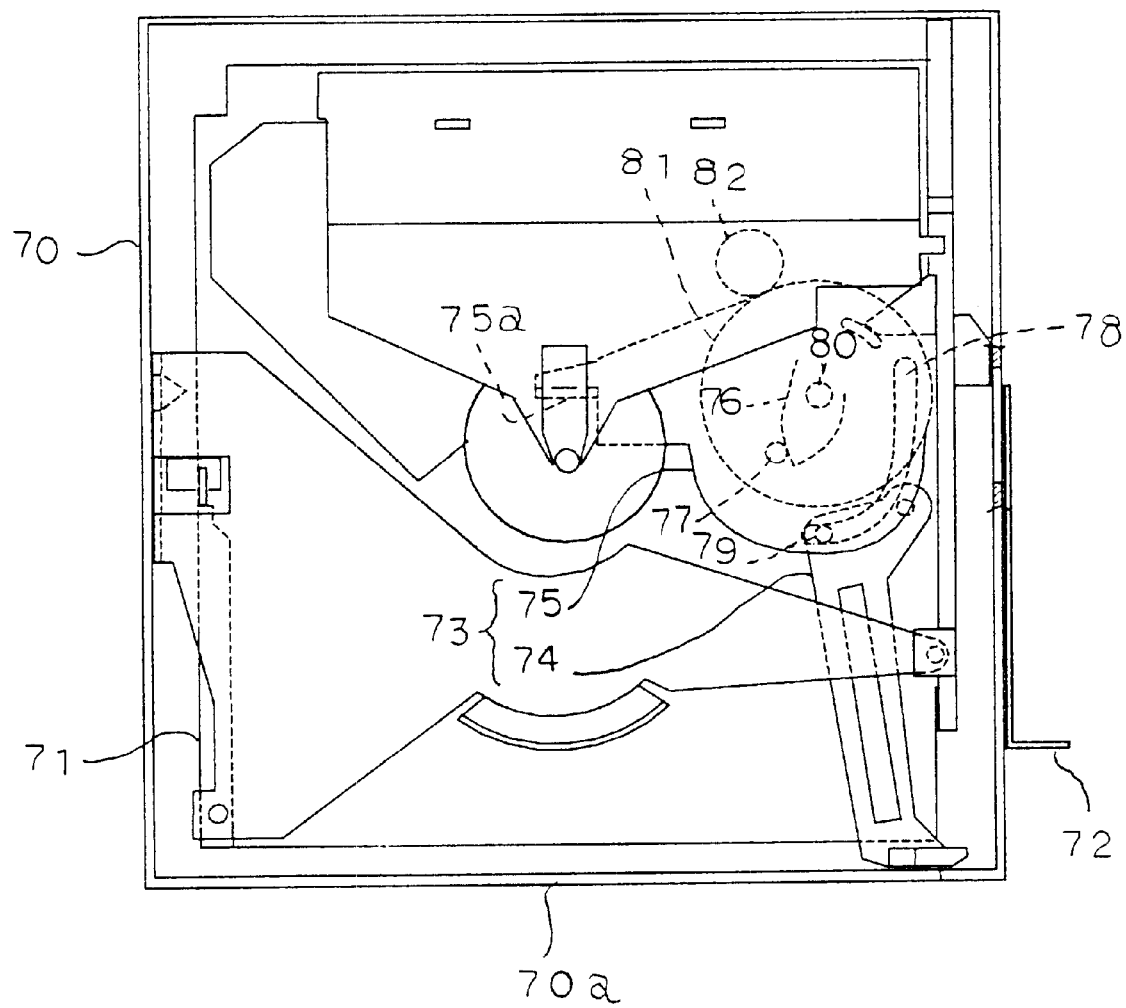
FIG. 13 is a schematic plan view showing a mechanism part of a third embodiment of the disc ejecting apparatus according to the invention.
Figure 14:
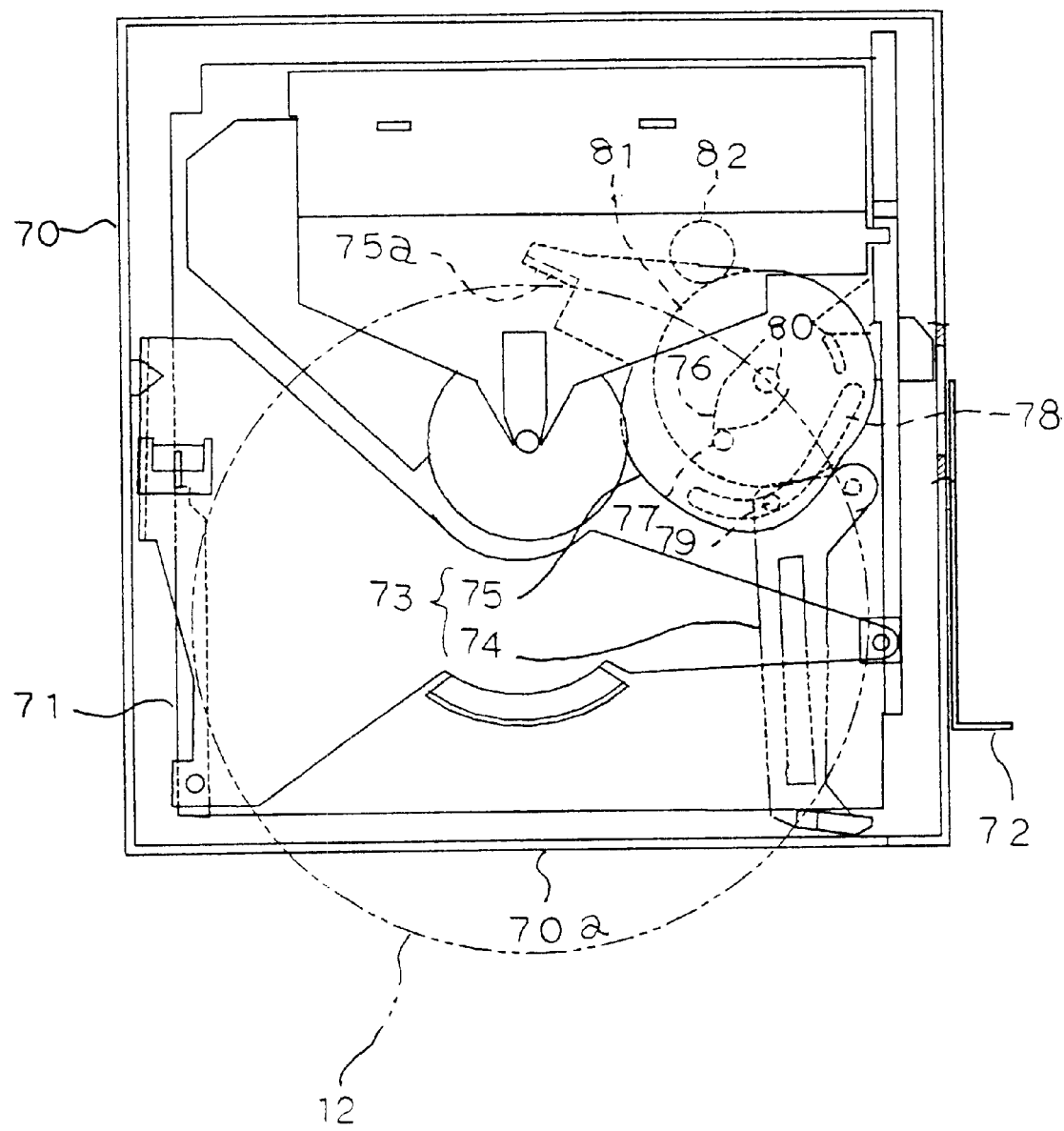
FIG. 14 is a schematic plan view showing the mechanical part of the same embodiment in a state during disc loading.
Figure 15:
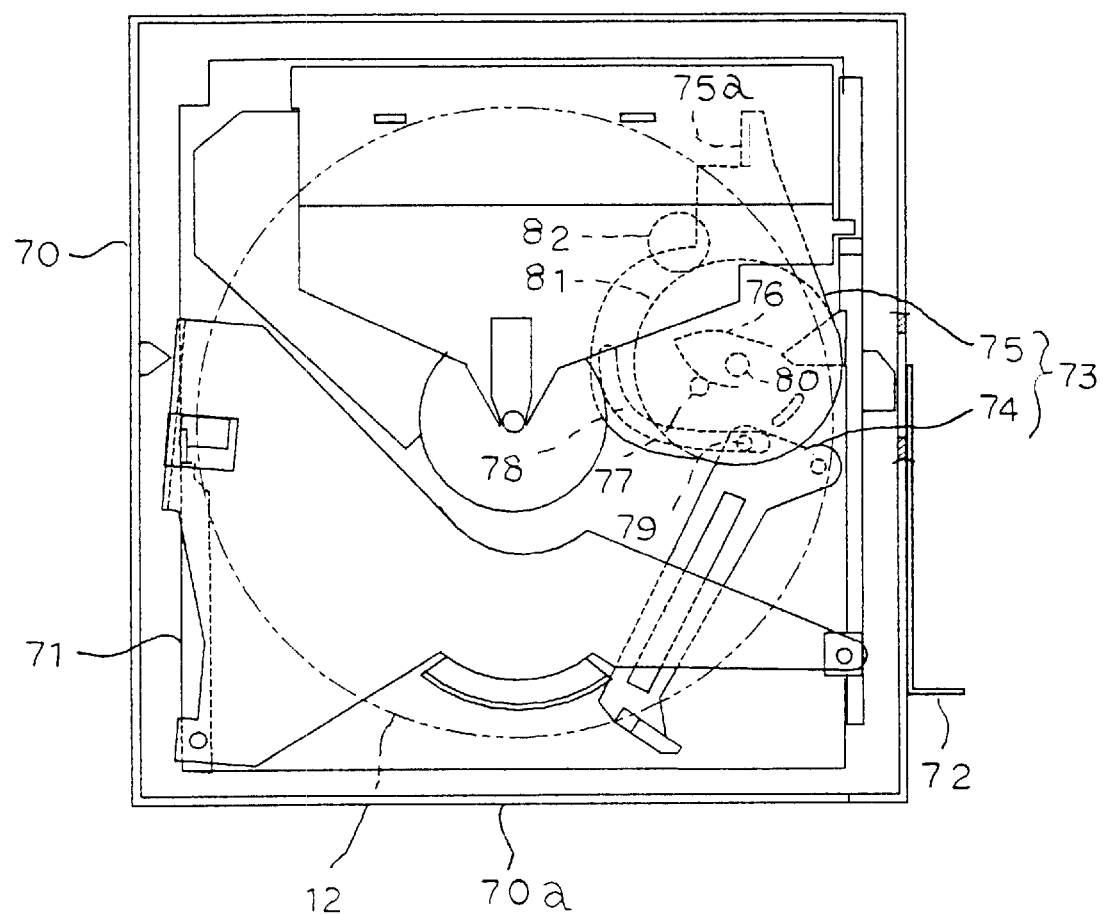
FIG. 15 is a schematic plan view showing the mechanical part of the same embodiment when the disc is loaded.

FIGS. 13 to 15 are schematic plan views showing a mechanical part of a disc player. FIG. 13 shows the player before the disc loading, FIG. 14 shows the player while the disc 12 is loaded, and FIG. 15 shows the player after the disc has been loaded in the playback position.

Inside a player frame 70 a layer base 71 is elastically supported such that it is floated with respect to the frame 70. An eject lever 72 is provided reciprocally on the outer surface of the frame 70.

On the player base 71 a disc transfer device 73 is mounted. The disc transfer device 73 is constituted by a push-in lever 74 for pushing the disc 12 inserted from a disc inserting opening 70a to the playback position, and a push-back lever 75 for pushing back the disc 12 from the playback position toward the disc inserting opening 70a. Particularly, the push-back lever 75 constitutes an essential part of the disc ejecting mechanism. The push-back lever 75 has a cam wall 76. A cam roller 7 is elastically urged against the outer surface of the cam wall 76 to bias the push-back lever from a neutral position for rocking in one direction or the other.

The push-back lever 75 has a curved cam groove 78, and the push-in lever 74 has a cam follower pin 79 inserted in the cam groove 78. In the figures, reference numeral 80 designates a pivot axis with the push-back lever 75 rockably supported thereon. The push-back lever 75 has a large gear 81 formed as a coaxial integral gear. The large gear 82 is always in mesh with an intermediate gear 82. When the push-back lever 75 is rocked in the counterclockwise direction in the figures, its push-back portion 75a pushes the disc 2 from the playback position toward the disc inserting opening 70a.

Figure 16:
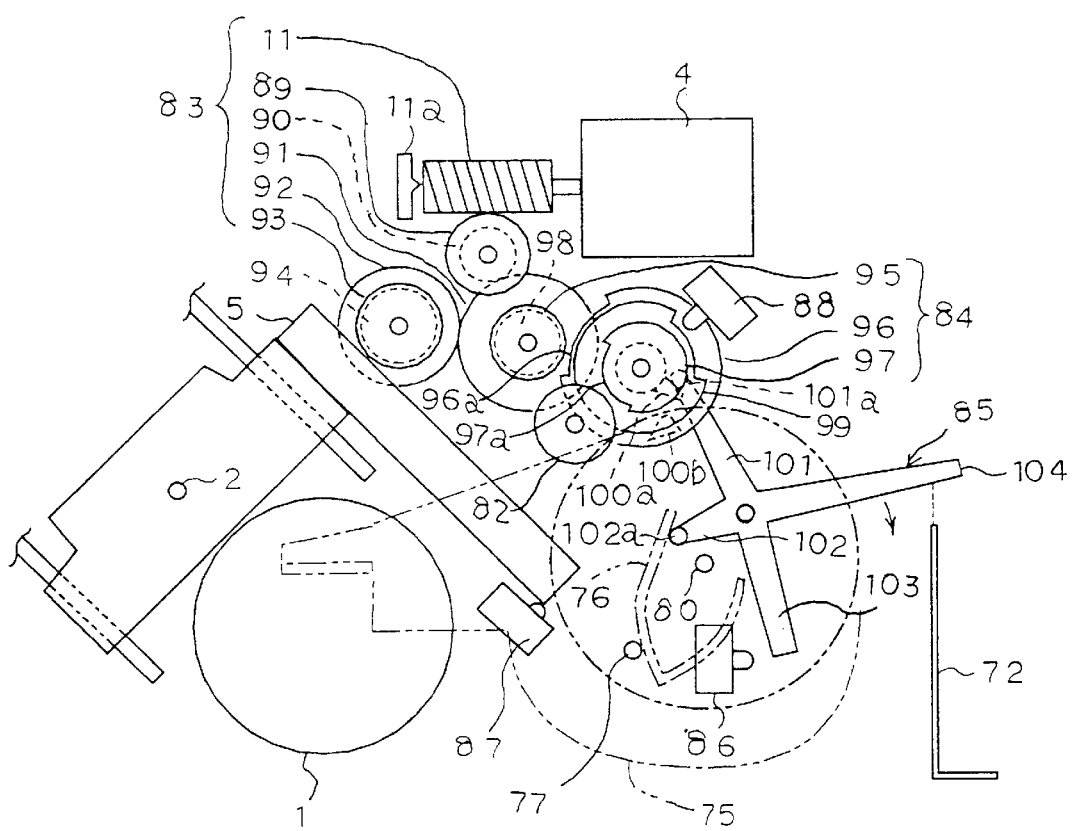
FIG. 16 is a schematic plan view showing an essential part of the same embodiment.

As shown in FIG. 16, on the back surface of the player base 71 are provided the pick-up 2, the pick-up drive motor 4, a first and a second power transmission route 83 and 84, a switching mechanism 85 operable for selectively turning on and off the second power transmission route 84, and a first to a third control switch 87 to 88. The first control switch 86 generates a motor start signal when the disc inserted from the disc inserting opening 12 is transported to the playback position. The second control switch 87 generates a pick-up position detection signal when it detects that the pick-up 2 is in a lead-in areas of the disc 12. The third control switch 88 generates a motor stop signal when the disc 12 is pushed back to a position, from which the disc 12 can be taken out through the disc inserting opening 70a. In the figures, reference numeral 11a designates a restricting member for restricting the movement of the worm 11 in the axial direction.

As shown in FIG. 16, the first power transmission route 83 includes a first gear 89 in mesh with the worm 11, a second gear 90 coaxial and integral therewith, a third gear 91 in mesh with the second gear 90, a fourth gear 90 in mesh with the third gear 91, and a fifth gear 91 in mesh with the second gear 90. The fifth gear 93 is in mesh with the rack 5 of the pick-up support 3. Between the fourth and fifth gears 92 and 93 is interposed a first friction sheet 94 constituting part of a slip mechanism.

A second power transmission route 84 is constituted by a sixth gear 95 coaxial with a third gear 91, a partial large gear 96 and a partial small gear 97 coaxial and integral therewith. Normally, the partial large gear 96 is held out of mesh with the sixth gear 95 with its non-tooth portion 96a face to face therewith, but when the gear 96 is slightly rotated, its tooth portion is brought into mesh with the sixth gear 95. Normally, the partial small gear 97 is held out of mesh with the intermediate gear 82 with its non-tooth portion 97a face to face therewith, but when the gear 97 is slightly rotated, its tooth portion is brought into mesh with the intermediate gear 82. Between the third and sixth gears 91 and 95, a second friction sheet 98 constituting part of the excess load absorbing mechanism is interposed. The partial large gear 96 has a switch operating cam 99 and a first and a second engagement portion 100a and 100b.

The switching mechanism 85 is constituted by a rocking lever. The mechanism 85 has four arms 101 to 104 radially extending from the rocking center. The first arm 101 has an engagement pin 101a provided at its free end, and the second arm 102 has a cam follower pin 102a provided at its free end. The engagement pin 10a is for engagement with either one of the first and second engagement portions 100a and 100b to have non-tooth portions 96a and 97a of the partial large and small gears 96 and 97 face the sixth gear 95 and the intermediate gear 82, respectively. The cam follower pin 102 is for being in contact with the inner surface of the cam wall 76. The third arm 103 is adapted to turn on and off the first control switch 86. The fourth arm 104 is adapted to be pushed by the eject lever 72.

Figure 17:
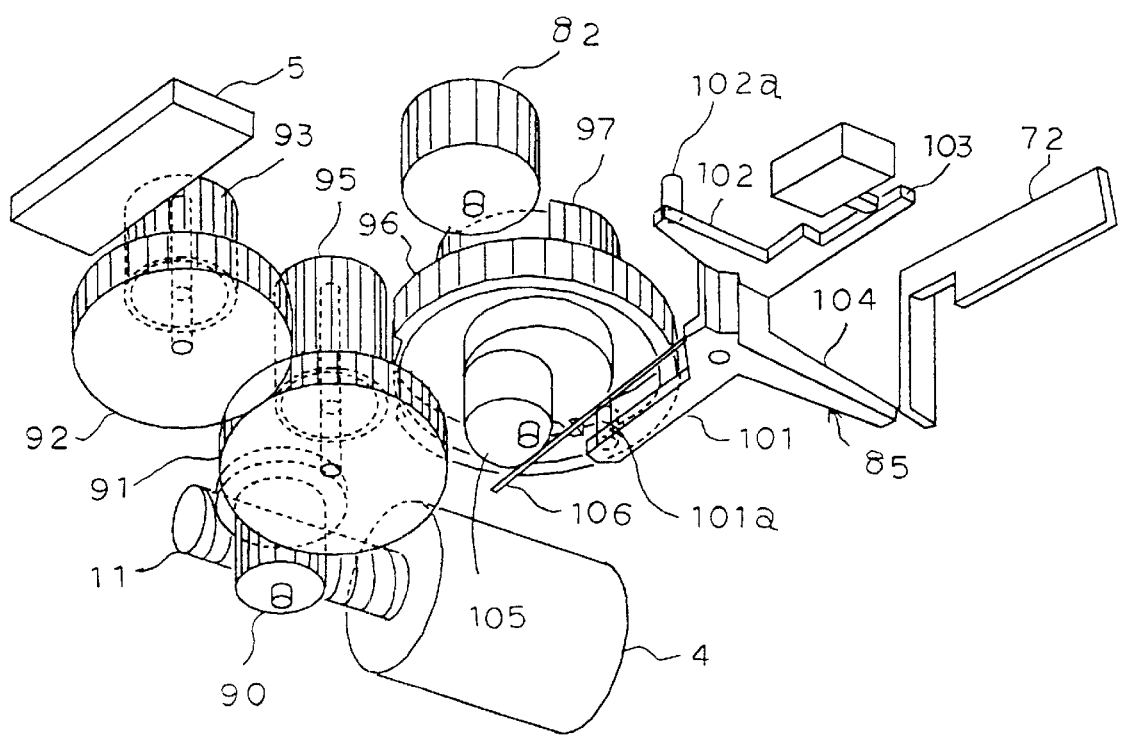
FIG. 17 is an upward perspective view showing a part of the same embodiment.
Figure 18:
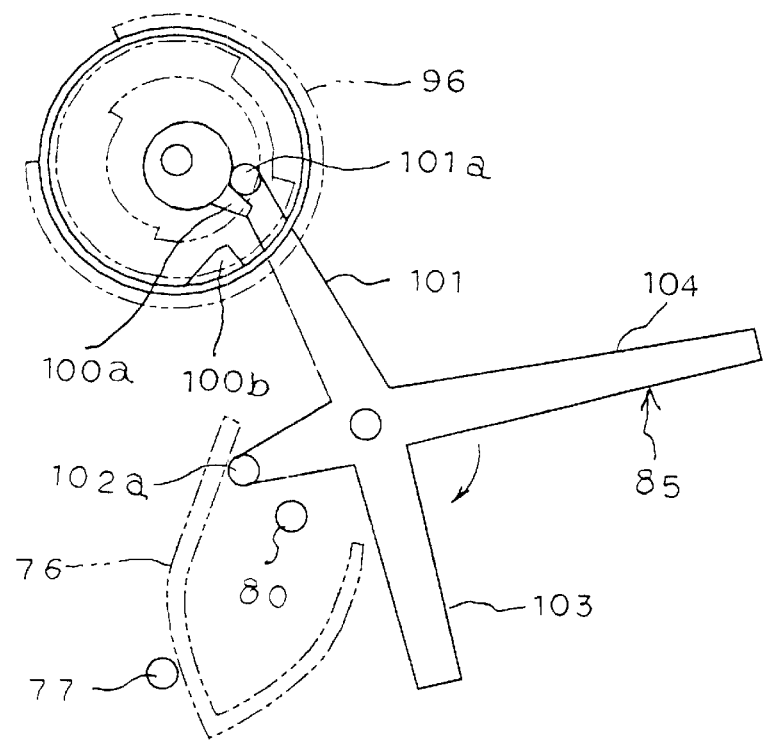
FIG. 18 is a schematic plan view showing a part of the same embodiment.

As shown in the perspective view of FIG. 17, the partial large gear 96 has an eccentric cylindrical portion 105 formed on the bottom surface. The partial large gear 96 is rotationally biased by a rod spring 106 pushing the eccentric cylindrical portion 105. When the engagement pin 101a is out of engagement with the first or second engagement portion 100a or 100b, the tooth portions of the partial large and small gear 96 and 97 are brought into mesh with the sixth gear 95 and the intermediate gear 82. The rod spring 106 is mounted on the rocking pivot axis of the switching mechanism 85 such as to always bias the mechanism 85 in the clockwise direction (i.e., direction of arrow) as shown in FIGS. 16 and 18. When the push-back lever 75 is at the position after the disc 12 has been pushed back, the cam wall 76 is held in engagement with the cam follower pin 102a, as shown in FIG. 18 to hold the engagement pin 101a at a position of engagement with the first engagement portion 100a.

Figure 19:
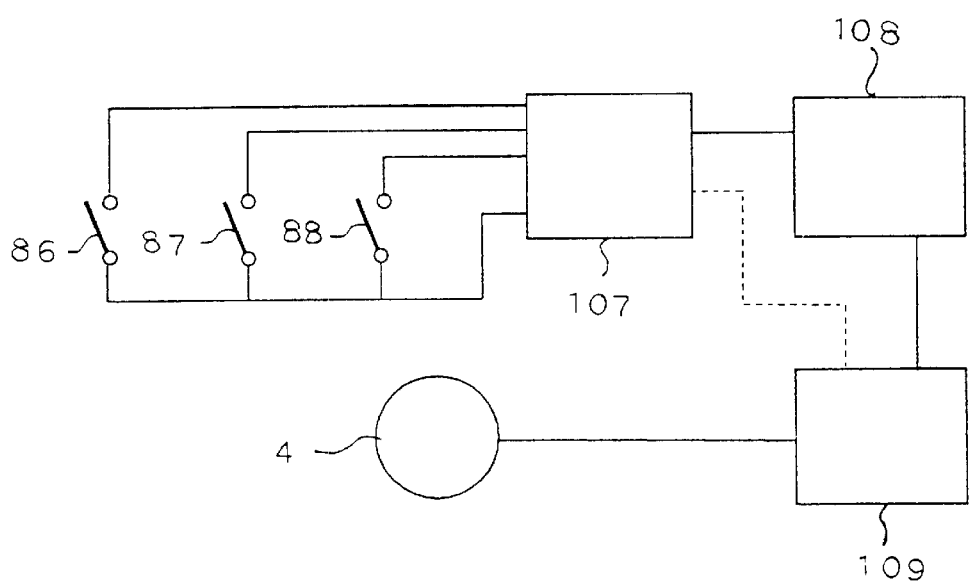
FIG. 19 is a circuit diagram showing the same embodiment.

FIG. 19 shows an arrangement of a circuit for controlling the operation of the disc ejecting apparatus. In FIG. 19, reference numeral 107 designates an operational circuit for judging the operating state of the disc player by receiving signals from the first to third switches 86 to 88. Reference numeral 108 designates a control circuit for controlling the playback of the disc by receiving a signal from the operational circuit 107. Reference numeral 109 designates a drive circuit for controlling the pick-up drive motor 4 by receiving a signal from the control circuit 108, and the drive circuit has also a function of a high voltage supply means.

When the first control switch 86 is turned on, the operational circuit 107 causes the control circuit 108 to operate the drive circuit 109 for driving the pick-up drive motor 4 for forward rotation. As a result, the pick-up 2 is moved from the lead-in area of the disc 12 toward the outer periphery thereof. In this step, the control circuit 108 controls the playback of the disc by the pick-up 2.

When the first control switch 86 is turned off, the operational circuit 107 causes the control circuit 108 to operate the drive circuit 109, whereby a high voltage is supplied to the pick-up drive motor 4 which is rotated with high speed in the reserve direction. As a result, the pick-up 2 is moved at an increased high speed toward the lead-in area of the disc 12, while the playback operation is stopped by the control circuit 108. The motor 4 is stopped when the third control switch 88 is turned off.

The operation in a third embodiment will now be described.

Before the disc insertion, as shown in FIG. 13, the push-in and push-back levers 74 and 75 are in their positions ready to receive the disc 12. Also, as shown in FIGS. 16 and 18, the cam wall 76 is pushing the cam follower pin 102a to hold the engagement pin 101a of the turn-on/off mechanism 85 in engagement with the first engagement portion 100a. At this time, the first and third control switches 86 and 88 are "off" to hold the pick-up drive motor 4 stopped. However, the second control switch 87 is held "on" by the rack 5.

Figure 20:
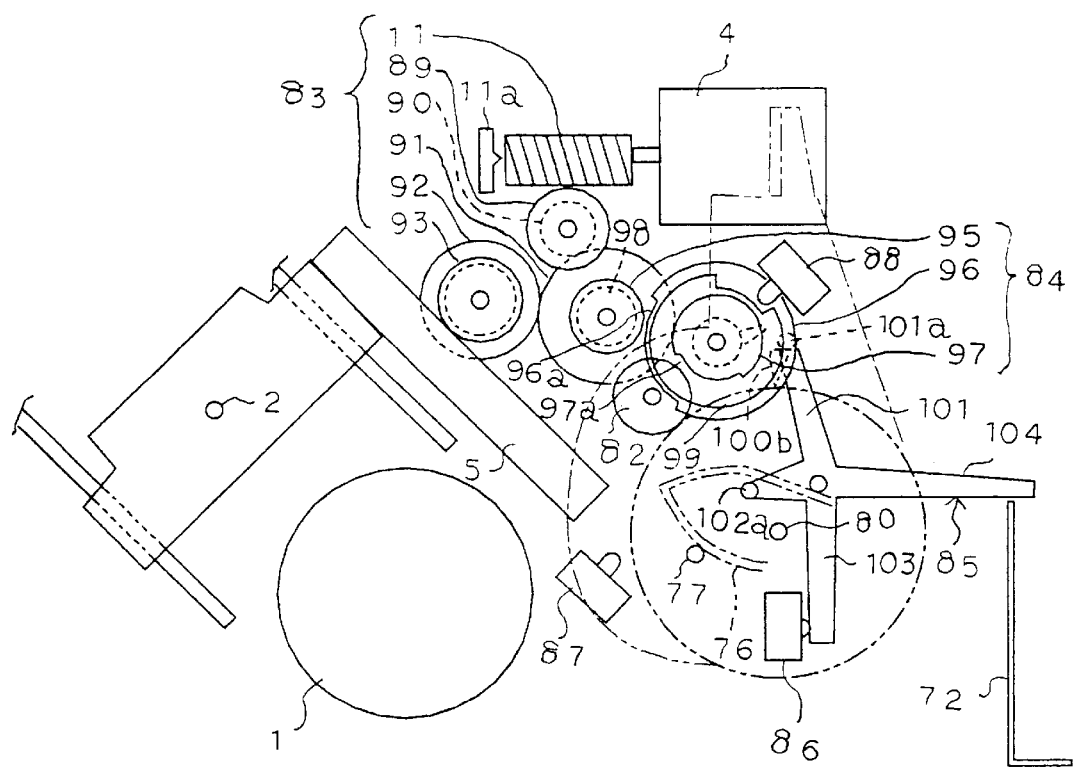
FIG. 20 is a schematic plan view showing the same embodiment in an operating state.

When the disc 12 is inserted from the disc inserting opening 70a in this state, the push-back lever 75 is pushed by the disc 12 and rocked in the clockwise direction. After the apex of the cam wall 76 has been passed by the cam roller 77, the push-back lever 75 is rocked greatly in the clockwise direction by the cam roller 77. As shown in FIG. 20, the cam wall 76 is thus separated from the cam follower pin 102a. Furthermore, push-in lever 74 pushes the disc 12 up to the playback position while undergoing rocking movement in the counterclockwise direction in an interlocked relation to the push-back lever 85.

As a result of the separation of the cam wall 76 from the cam follower pin 102a, the switching mechanism 85 is rocked in the clockwise direction, causing the engagement pin 101a to get out of the first engagement portion 100a and moved onto the orbit of the second engagement portion 100b. As a result, the partial large gear and small gears 96 and 97 are caused to undergo a constant amount of rocking in the counterclockwise direction. However, these gears 96 and 97 are not rotated until their tooth portions are brought into mesh with the corresponding gears, but are stopped while bringing the second engagement portion 100b into contact with the engagement pin 101a. Also, the first control switch 86 is turned on by being pushed by the third arm 103, causing the pick-up drive motor 4 to be driven for rotation in the forward direction. The torque of the motor 4 is transmitted via the first power transmission route 83 to the rack 5, thus causing movement of the pick-up 2 from the lead-in area of the disc 12 toward the outer periphery for the playback of the disc.

Figure 21:
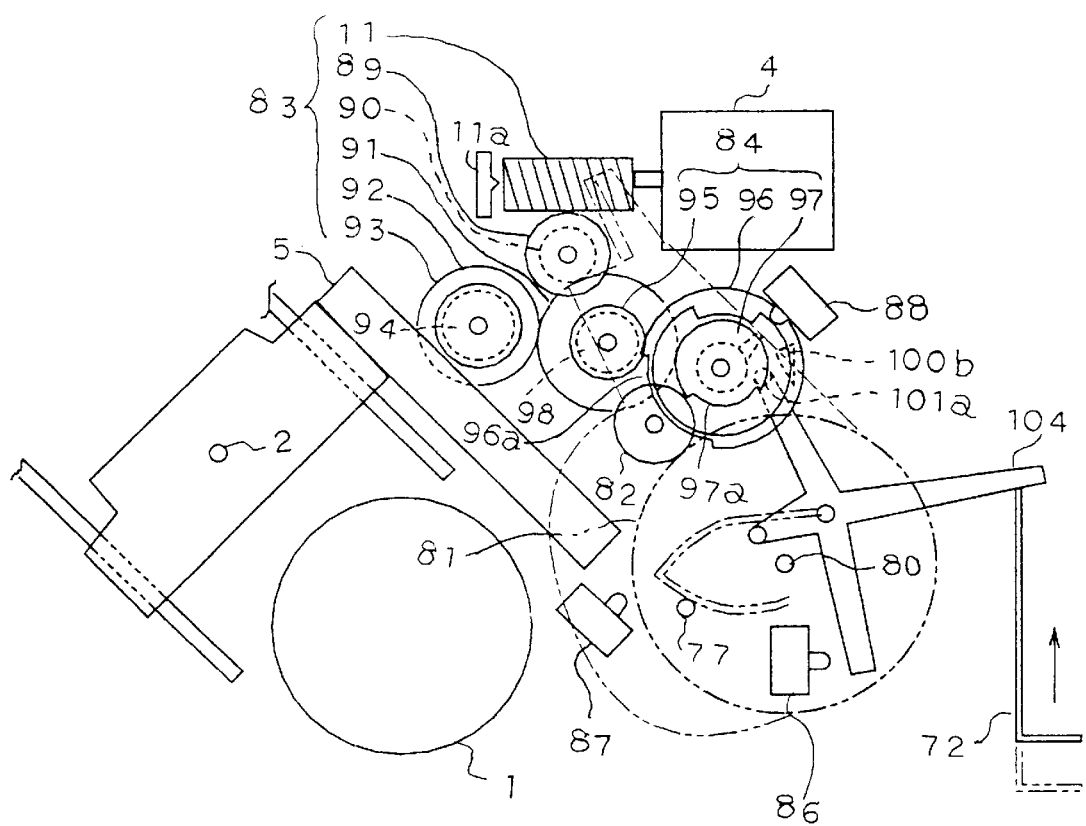
FIG. 21 is a schematic plan view showing the same embodiment in an operating state.

When the eject lever 7 is pushed during the disc playback operation, as shown in FIG. 21, the eject lever 72 pushes the fourth arm 104 to cause rocking of the switching mechanism 85 in the counterclockwise direction, thus causing the engagement pin 101a to be separated from the second engagement portion 100b and moved onto the orbit of the first engagement portion 100a. Also, the third arm 103 is separated from the first control switch 86 which is turned off, thus causing the pick-up drive motor 4 to be driven for rotation at an increased speed in the reverse direction.

As a result of separation of the engagement pin 101a from the second engagement portion 100b, the tooth portions of the partial large and small gears 96 and 97 are brought into mesh with the sixth gear 95 and the intermediate gear 82, respectively. The torque of the motor 4 in the counterclockwise direction is thus transmitted via the first power transmission route 83 and the rack 5 to the pick-up 2, and is also transmitted via the second power transmission route 84 and the intermediate gear 82 to the large gear 81 as well. With the power transmitted to the large gear 81, the push-back lever 75 is rocked in the counterclockwise direction, causing the push-back portion 75a to push the disc 12 toward the disc inserting opening 70a. Also, with the rotation of the switch operating cam 99 integral with the large gear 96, the third control switch 88 is turned on once, but is turned off again to stop the motor 4 right before the partial large gear 96 and the switch operating cam 99 are stopped with the first engagement pin 100a brought into contact with the engagement pin 101a.

Meanwhile, with the transmission of the torque of the pick-up drive motor 4 via the first power transmission route 83 and the rack 5 to the pick-up 2, the pick-up 2 is moved toward the lead-in area of the disc 12. When the pick-up 2 reaches the lead-in area, the rack pushes and turns on the second control switch 87.

Until the third control switch 88 is turned off by the switch operating cam 99, the pick-up drive motor 4 is continually driven to complete the operation of ejecting the disc 12 by the push-back lever 75. However, after the pick-up 2 has reached the lead-in area, the operation of ejecting the disc 12 by the push-back lever 75 is performed owing to the slip action of the slip mechanism (i.e., friction sheet 94) inserted in the first power transmission route 83.

In the event of an erroneous operation while the disc 2 is pushed back by the push-back lever 75, or when the movement of the push-back lever 75 is irrationally disturbed, the excess load absorbing mechanism (i.e., second friction sheet 98) provided in the second power transmission route 84 provides the slip action, thus preventing damage to the disc 2, the motor 4 and other parts. When the disturbed state is released, the push-back lever 7 is caused to resume the disc ejection from this instant. It is thus possible to obtain reliable ejection of the disc 2 from the disc inserting opening 70a.

As has been described in the foregoing, according to the invention with the slip mechanism provided in the route leading from the pick-up drive motor to the pick-up ejecting mechanism, the disc ejection can be commenced while causing restoration of the pick-up to the initial position, and after the restoration of the pick-up to the initial position, it can be continued to quickly eject the disc owing to the slip action of the slip mechanism.

Also, in the power transmission route leading from the pick-up drive motor to the disc ejecting mechanism is provided with an excess load absorbing mechanism for cutting off the power transmission when experiencing a load in excess of the load in the slip mechanism. Thus, when it is intended to irrationally stop the disc ejection, the excess load absorbing mechanism can prevent damage to the system by absorbing the excess torque of the pick-up drive motor.

Furthermore, the switching mechanism is provided in the power transmission route leading from the pick-up drive motor to the disc ejecting mechanism such that the switching mechanism is turned into the closing state by an eject commanding operation, and also the hold mechanism for holding the switching mechanism in the closing state is provided such that it is turned into the open state in the last stage of the disc ejection by the disc ejecting mechanism. Thus, it is possible to automatically cut off the second power transmission route after completion of the disc ejection.

Still further, with the provision of the high voltage supply means for supplying a high voltage to the pick-up drive motor in response to an eject commanding operation, when ejecting the disc, the motor can be driven at an increased high speed to eject the disc more quickly.

What is claimed is:

1. A disc ejecting apparatus comprising a first power transmission route leading from a pick-up drive motor to a pick-up and a second power transmission route leading from the pick-up drive motor to a disc ejecting mechanism, for ejecting a disc by utilizing the torque of the pick-up drive motor, wherein:

a slip mechanism is provided in the first power transmission route to provide a slip action to cut off the power transmission when a load exceeds a predetermined value;

a switching mechanism is provided in the second power transmission route, said switching mechanism being operable for selectively turning on and off the second power transmission route; and said pick-up drive motor is started in response to an eject commanding operation to cause restoration of the pick-up to the initial position, while also the switching mechanism is turned on to cause ejection of a disc by the disk ejecting mechanism, the disc ejection by the disc ejecting mechanism being continued after the restoration of the pick-up to the initial position owing to a slip action of said slip mechanism.

2. The disc ejecting apparatus according to claim 1, wherein an excess load absorbing mechanism is provided in the second power transmission route so as to cut off the power transmission when experiencing a load in excess of the load in the slip mechanism.

3. The disc ejecting apparatus according to claim 1, which further comprises a hold mechanism for holding the switching mechanism in the close state, the hold mechanism being adapted to release the switching mechanism in the last stage of the disc ejection of the disc ejecting mechanism, thereby to allow the switching mechanism to turn into an open state.

4. The disc ejecting apparatus according to claim 1, wherein which further comprises a high voltage supply means for supplying a high voltage to the pick-up drive motor in response to an eject commanding operation.

5. The disc ejecting apparatus according to claim 1, wherein said second power transmission route includes a partial gear having a tooth portion and a non-tooth portion, and an opposing gear which is adapted to engage with said tooth portion of the partial gear, and wherein said switching mechanism is operable to selectively position said non-tooth portion of the partial gear so as to be opposite said opposing gear thereby maintain said second power transmission route to be cut.

* * * * *